United States Patent
Karkheck

(10) Patent No.: US 10,505,493 B2
(45) Date of Patent: Dec. 10, 2019

(54) BUILDING INTEGRATED PHOTOVOLTAIC TILE MOUNTING SYSTEM

(71) Applicant: SolarCity Corporation, San Mateo, CA (US)

(72) Inventor: Johann Fritz Karkheck, Petaluma, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 15/653,493

(22) Filed: Jul. 18, 2017

(65) Prior Publication Data

US 2019/0028054 A1 Jan. 24, 2019

(51) Int. Cl.
*H02S 20/25* (2014.01)
*H02S 40/36* (2014.01)
*E04D 1/34* (2006.01)
*E04D 1/26* (2006.01)
(Continued)

(52) U.S. Cl.
CPC ............ *H02S 20/25* (2014.12); *E04D 1/26* (2013.01); *E04D 1/34* (2013.01); *E04D 12/004* (2013.01); *H02S 40/36* (2014.12); *E04D 1/30* (2013.01); *E04D 2001/3438* (2013.01); *E04D 2001/3441* (2013.01); *E04D 2001/3447* (2013.01);
(Continued)

(58) Field of Classification Search
CPC . H02S 20/25; H02S 40/36; E04D 1/34; E04D 1/26; E04D 12/004
See application file for complete search history.

(56) References Cited

U.S. PATENT DOCUMENTS

| 4,040,867 A | 8/1977 | Forestieri et al. |
| 4,111,188 A | 9/1978 | Murphy, Jr. |
| 4,197,833 A | 4/1980 | Pelish |

(Continued)

FOREIGN PATENT DOCUMENTS

| DE | 202009002209 U1 | 7/2010 |
| DE | 202010005806 U1 | 11/2010 |

(Continued)

OTHER PUBLICATIONS

Burkart, Karl, "*Solar innovations: Integrated 'coolroof' solar shingles,*" Mother Nature Network, website: www.mnn.com/green-tech/research-innovations/blogs/solar-innovations-integrated-coolroof-solar-shingles,_ published Dec. 19, 2008, 3 pages.

(Continued)

*Primary Examiner* — Allison Bourke
(74) *Attorney, Agent, or Firm* — Kilpatrick Townsend & Stockton LLP

(57) ABSTRACT

Building integrated photovoltaic (BIPV) systems provide for solar panel arrays with improved aesthetics and efficiency that can replace conventional roof structures. BIPV mounting systems described herein allow for improved versatility and ease of installation as compared to conventional approaches. Such BIPV mounting systems can include photovoltaic (PV) roof tiles with separate mechanical coupling features and electrical contact portions for use with tile connectors having both mechanical and electrical coupling features. Such PV tiles can be mechanically and electrically coupled in series through the tile connectors without requiring wire bussing between adjacent PV roof tiles and the tile connectors can be slidable within a batten bracket to easily accommodate PV roof tiles of differing dimensions.

20 Claims, 9 Drawing Sheets

(51) Int. Cl.
  *E04D 12/00* (2006.01)
  *E04D 1/30* (2006.01)
(52) U.S. Cl.
  CPC ............... *E04D 2001/3458* (2013.01); *E04D 2001/3473* (2013.01); *E04D 2001/3494* (2013.01)

(56) References Cited

U.S. PATENT DOCUMENTS

| | | |
|---|---|---|
| 4,202,319 A | 5/1980 | Vinz |
| 4,221,208 A | 9/1980 | Murphy, Jr. |
| 4,237,861 A | 12/1980 | Fayard et al. |
| 4,319,437 A | 3/1982 | Murphy |
| 4,428,360 A | 1/1984 | Cohen |
| 4,428,361 A | 1/1984 | Straza |
| 4,946,512 A | 8/1990 | Fukuroi et al. |
| 5,022,381 A | 6/1991 | Allegro |
| 5,437,735 A | 8/1995 | Younan et al. |
| 5,482,569 A | 1/1996 | Ihara et al. |
| 5,509,246 A | 4/1996 | Roddy |
| 5,575,861 A | 11/1996 | Younan et al. |
| 5,590,495 A | 1/1997 | Bressler et al. |
| 5,651,226 A | 7/1997 | Archibald |
| 5,986,203 A | 11/1999 | Hanoka et al. |
| 6,360,497 B1 * | 3/2002 | Nakazima ............... E04D 1/24 126/622 |
| 6,453,629 B1 | 9/2002 | Nakazima et al. |
| 6,856,496 B1 | 2/2005 | Mucci et al. |
| 6,906,253 B2 | 6/2005 | Bauman et al. |
| 6,928,775 B2 | 8/2005 | Banister |
| 7,328,534 B2 | 2/2008 | Dinwoodie |
| 7,465,873 B2 | 12/2008 | Nomura et al. |
| 7,487,771 B1 | 2/2009 | Eiffert et al. |
| 7,678,990 B2 | 3/2010 | McCaskill et al. |
| 7,678,991 B2 | 3/2010 | McCaskill et al. |
| 7,713,089 B2 | 5/2010 | Faust et al. |
| 7,858,874 B2 | 12/2010 | Ruskin et al. |
| 7,956,280 B2 | 6/2011 | Kobayashi |
| 8,109,048 B2 | 2/2012 | West et al. |
| 8,168,880 B2 | 5/2012 | Jacobs et al. |
| 8,209,920 B2 | 7/2012 | Krause et al. |
| 8,215,070 B2 | 7/2012 | Railkar et al. |
| 8,266,846 B2 | 9/2012 | Schoell |
| 8,309,840 B2 | 11/2012 | Stevens et al. |
| 8,312,693 B2 | 11/2012 | Cappelli |
| 8,333,040 B2 | 12/2012 | Shiao et al. |
| 8,468,754 B2 | 6/2013 | Railkar et al. |
| 8,468,756 B2 | 6/2013 | Arguelles |
| 8,476,523 B2 | 7/2013 | Bennett |
| 8,507,784 B2 | 8/2013 | White |
| 8,511,006 B2 | 8/2013 | Reisdorf et al. |
| 8,536,442 B2 | 9/2013 | Stancel |
| 8,603,613 B2 | 12/2013 | Larson |
| 8,607,510 B2 | 12/2013 | Daniels |
| 8,613,170 B2 | 12/2013 | De Nardis |
| 8,621,813 B2 | 1/2014 | Dube |
| 8,671,630 B2 | 3/2014 | Lena et al. |
| 8,713,860 B2 | 5/2014 | Railkar et al. |
| 8,776,455 B2 | 7/2014 | Azoulay |
| 8,782,972 B2 | 7/2014 | Grieco |
| 8,833,005 B1 | 9/2014 | Croft et al. |
| 8,863,451 B2 | 10/2014 | Jenkins et al. |
| 8,875,454 B2 | 11/2014 | Arguelles |
| 8,938,920 B2 | 1/2015 | Cleereman et al. |
| 8,943,766 B2 | 2/2015 | Gombarick, Jr. |
| 8,984,818 B2 | 3/2015 | McPheeters et al. |
| 8,994,224 B2 | 3/2015 | Mehta et al. |
| 9,038,330 B2 | 5/2015 | Bellavia |
| 9,166,523 B2 | 10/2015 | Kiik et al. |
| 9,169,646 B2 | 10/2015 | Rodrigues et al. |
| 9,184,325 B2 | 11/2015 | Schulze et al. |
| 9,273,885 B2 | 3/2016 | Rodrigues et al. |
| 9,455,663 B1 | 9/2016 | Carrington |
| 9,634,606 B2 | 4/2017 | Balyon |
| 9,647,300 B2 | 5/2017 | Thramann et al. |
| 2004/0221886 A1 * | 11/2004 | Oono ................ H02S 20/25 136/251 |
| 2005/0178429 A1 | 8/2005 | McCaskill et al. |
| 2005/0178430 A1 | 8/2005 | McCaskill et al. |
| 2006/0032527 A1 | 2/2006 | Stevens et al. |
| 2006/0225780 A1 | 10/2006 | Johnson, III et al. |
| 2007/0157963 A1 * | 7/2007 | Metten ................ E04D 12/004 136/251 |
| 2008/0149170 A1 | 6/2008 | Hanoka |
| 2008/0302031 A1 | 12/2008 | Bressler et al. |
| 2009/0159118 A1 | 6/2009 | Kalkanoglu et al. |
| 2009/0194143 A1 | 8/2009 | Jacobs et al. |
| 2009/0205270 A1 | 8/2009 | Shaw et al. |
| 2009/0223550 A1 | 9/2009 | Curtin et al. |
| 2010/0313499 A1 | 12/2010 | Gangemi |
| 2011/0000535 A1 | 1/2011 | Davidson |
| 2011/0017278 A1 | 1/2011 | Kalkanoglu et al. |
| 2011/0132427 A1 | 6/2011 | Kalkanoglu et al. |
| 2011/0225904 A1 | 9/2011 | Railkar et al. |
| 2011/0289867 A1 | 12/2011 | Balbo Di Vinadio |
| 2012/0017972 A1 | 1/2012 | Jenkins et al. |
| 2012/0085040 A1 | 4/2012 | Ketwitz, Jr. |
| 2012/0151856 A1 | 6/2012 | Azoulay |
| 2012/0174505 A1 | 7/2012 | Jacobs et al. |
| 2012/0204927 A1 | 8/2012 | Peterson et al. |
| 2013/0055664 A1 | 3/2013 | Gomarick, Jr. et al. |
| 2013/0167472 A1 | 7/2013 | Jenkins et al. |
| 2014/0150843 A1 | 6/2014 | Pearce et al. |
| 2014/0167513 A1 | 6/2014 | Chang et al. |
| 2014/0230877 A1 | 8/2014 | Goldberg et al. |
| 2014/0352760 A1 | 12/2014 | Haynes et al. |
| 2014/0366464 A1 | 12/2014 | Rodrigues et al. |
| 2015/0101270 A1 | 4/2015 | Croft et al. |
| 2015/0179346 A1 | 6/2015 | Lee et al. |
| 2016/0254776 A1 | 9/2016 | Rodrigues et al. |
| 2017/0126170 A1 * | 5/2017 | Friedrich ................ F24S 20/69 |

FOREIGN PATENT DOCUMENTS

| | | |
|---|---|---|
| DE | 202010016394 U1 | 4/2011 |
| DE | 102011105309 A1 | 12/2012 |
| EP | 0 018 543 A1 | 11/1980 |

OTHER PUBLICATIONS

Sparks, Daniel, "Tesla, Inc.'s Solar Tiles: What You Need to Know," The Motley Fool website, May 10, 2017, Alexandria, VA, retrieved on the internet at: https://www.fool.com/investing/2017/05/10/tesla-incs-solar-tiles-what-you-need-to-know.aspx, 8 pages.

* cited by examiner

BUILDING INTEGRATED PHOTOVOLTAIC TILE MOUNTING SYSTEM

CROSS-REFERENCE TO RELATED APPLICATIONS

This generally relates to U.S. Provisional Application No. 62/413,893 filed on Oct. 27, 2016 and U.S. Non-Provisional application Ser. No. 15/399,712 filed Jan. 5, 2017; each of which is incorporated herein by reference in its entirety for all purposes.

TECHNICAL FIELD

This generally relates to photovoltaic mounting systems, and in particular building-integrated photovoltaic tile systems.

BACKGROUND

Solar is becoming increasingly popular in the United States and abroad, but penetration remains relatively low versus the number of homes that could benefit from solar. The price per kilowatt for solar is now competitive with or below that of fossil fuel-based utility power in most areas, however, solar largely remains a niche product for those who value saving money, reducing $CO_2$ emissions, or both.

One factor that may limit the adoption of solar technology is aesthetics. Most residential solar systems are installed as modules over an existing tile or composition shingle roof. The solar array, which often only covers a portion of the roof, or even a portion of one mounting plane on the roof, stands out as separate and distinct from the existing roof, both in height and material. This structure is therefore visible even from the street level and over large distances.

Another obstacle to solar adoption in existing homes is the dissonance between the age of the existing roof and the solar system, particularly where the existing roof is made from composition shingles. The expected life of a solar system can be 25 years or more, and the expected life of a composition shingle roof is also about 25 years, depending on the local climate and specific tile materials, however, at the time a customer is considering going solar, their existing roof may be several years, if not decades, into that lifespan. So the customer may be presented with the dilemma of getting a new roof first, increasing the cost of going solar, or installing a 25-year solar system on a roof which may have a relatively shorter remaining operational lifespan.

Accordingly, there is a need to resolve the dissonance between the expected life of the solar system and the remaining life of the roof, that also blends in more aesthetically with the complete roof surface or at least the mounting plane, and that does not require the prospective customer to pay for a new roof and a new solar system over that roof.

While various photovoltaic roof tiles have been proposed, successfully integration of photovoltaic tiles into a readily installable complete roofing system has proven elusive. Among the challenges associated with these types of roofing tiles is complexity in installation, particularly in regard to securing the tiles in conjunction with electrically coupling the tiles within the overall photovoltaic system. These complexities often require specialized equipment and accessories for a given type of roof, which can limit the range of such systems available to a consumer. Another challenge is maintaining serviceability of photovoltaic tiles after installation and the ability to repair broken tiles since integrated systems can often be difficult to disassemble or modify after installation, particularly when the photovoltaic tiles are electrically coupled within the system. Thus, there is a need for photovoltaic tiles and mounting systems for building-integrated photovoltaic systems that allow for ease of installation and compatibility with differing roof configurations, that are long lasting, safe, and reliable, and that allow for ready removal of individual tiles after installation for servicing or replacement.

BRIEF SUMMARY

Building integrated photovoltaic (BIPV) mounting systems for solar roof tiles are described herein. Such mounting systems allow for improved ease of installation in both mechanically coupling the PV tiles to the roof surface and in electrically interconnecting the PV tiles for mounting within the system.

In one aspect, the invention pertains to a building-integrated photovoltaic roofing system that includes multiple PV roof tiles and multiple movable or slidable tile connectors. In some embodiments, each PV roof tile is formed of a laminate structure and includes at least one photovoltaic cell encased in the laminate structure. A positive and a negative electrical lead of the at least one photovoltaic cell are disposed within the laminate structure and typically extend out of the laminate, adjacent the left and right edges, respectively. Each of the tile connectors is configured for mechanically coupling one or more roof tiles with the roof and electrically coupling one or more adjacent tiles within the course. The tile connectors can be further configured to slide within a laterally extending batten bracket.

In some embodiments, the tile connector includes a first connector portion configured for mechanically coupling with one or more roof tiles of the plurality, and a second connector portion configured for electrically coupling with one or more adjacent roof tiles of the plurality. In some embodiments, the first and second connector portions are separate portions, the second connector being laterally offset from the first connector portion.

In some embodiments, the first connector portion includes at least a pair of mechanical coupling features spaced laterally apart along the tile connector, the pair of mechanical coupling features being configured to releasably couple with a corresponding pair of mechanical couplings features along a top edge of a pair of adjacent roof tiles when mounted in a laterally extending row or course of roof tiles. In some embodiments, the first connector includes a pair of protruding connectors configured to snap-in within correspondingly shaped notches within a top portion of a pair of adjacent roof tiles when mounted within the course. Each of the protruding connectors can include a pair of resiliently deflectable spring arms that deflect inwardly when inserted along an insertion axis when received within the corresponding notch and resiliently return to a laterally extended position when mated within the corresponding notch to constrain movement of the roof tile along the insertion axis. In some embodiments, each of the resilient spring arms includes a post protruding away from the roof surface when the roof tiles of the plurality are mounted such that concurrent engagement of the respective posts of the pair of resiliently deflectable spring arms inwardly deflects the spring arms toward the insertion axis to facilitate release of the coupling feature from the corresponding notch of the roof tile for removal of the respective roof tile.

In another aspect, the mounting system further includes a removal tool to facilitate dis-engagement of the mechanical coupling features of one or more tile connectors to allow removal of one or more PV tiles from within a mounted BIPV system. In some embodiments, the removal tool is formed from a planar substrate having a pair of notches along a top edge thereof, each notch having a pair of angled surfaces dimensioned to concurrently engage the respective posts of the pair of resilient spring arms to facilitate release of each of the pair of protruding mechanical connectors.

In another aspect, the second connector of the tile connector includes an electrical connector housing configured to electrically couple with electrical contacts of adjacent PV tiles when inserted within the housing. In some embodiments, the second connector is disposed along the tile connector between a pair of mechanical coupling features. In some embodiments, the corresponding pair of electrical contacts of the PV tiles is defined as exposed portions of the positive and negative leads along the top edge of the respective PV tiles.

In another aspect, the BIPV system includes PV tiles, each having a lapping region along opposing lateral sides when the respective roof tile is mounted within the course. In some embodiments, each PV tile includes an underlap region along one lateral side and an overlap region along an opposing lateral side. One or both of the lapping regions can include a sealant bead of a flexible or elastomeric material to facilitate sealing when the underlap region is interfaced with the overlap region of an adjacent roof tile.

In still another aspect, the BIPV system can include a batten bracket that is configured for mounting on a laterally extending batten on a roof substrate and having an internal channel configured for insertion of the plurality of tile connectors from an end of the batten. The channel of the batten bracket can include one or more internal ridges to maintain an orientation of the plurality of tile connectors when slid within the channel.

In another aspect, the invention pertains to a PV roof tile formed of a laminate structure having a photovoltaic cell electrically coupled to respective positive and negative electrical contacts along a top portion of the PV roof tile and a first and second coupling feature along the top portion for mechanical coupling within the BIPV system. In some embodiments, the first and second mechanical coupling features are first and second cutouts shaped to receive a first and second mechanical coupling feature of a pair of tile connectors for releasably coupling. In some embodiments, the positive and negative electrical contact are configured to electrically couple with an electrical connector portion of a tile connector when the mechanical coupling features of the tile connector are coupled within the cut-outs of adjacent PV roof tiles. These and other embodiments are discussed in greater detail in the detailed description and drawing figures.

BRIEF DESCRIPTION OF THE DRAWINGS

Illustrative aspects of the present disclosure are described in detail below with reference to the following drawing figures. It is intended that embodiments and figures disclosed herein are to be considered illustrative rather than restrictive

DETAILED DESCRIPTION

Figure 1:
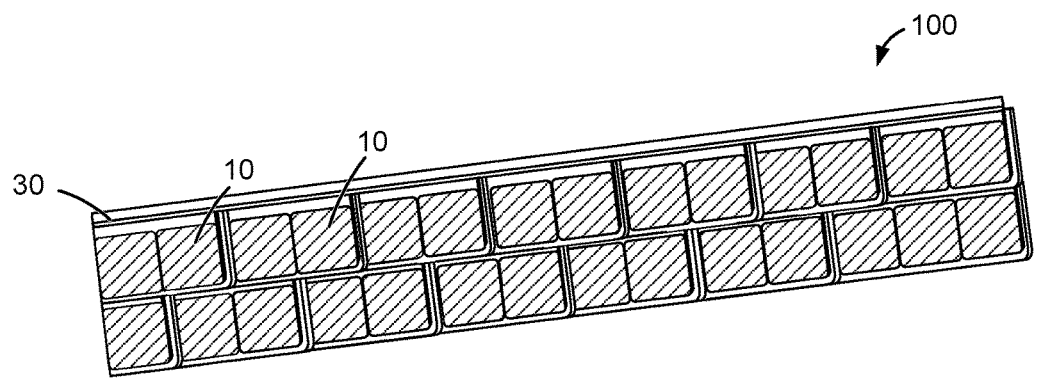
FIG. 1 shows an example of overlapping courses of photovoltaic roof tiles according to some embodiments.

The present disclosure describes various embodiments of photovoltaic roofing systems, in particular PV roof tiles, mounting systems and associated methods of installation. Various embodiments describe mounting systems that allow courses of tiles PV tiles to be quickly and easily mounted to a roof surface within an overall BIPV system. Such mounting systems can allow for improved ease of installation, reliability, versatility in accommodating differing types of PV tiles, and easy removal of individual PV tiles for replacement or servicing of the system.

Certain details are set forth in the following description and in the figures to provide a thorough understanding of various embodiments of the present technology. Other details describing well-known structures and systems often associated with PV systems, roofs, etc., however, are not set forth below to avoid unnecessarily obscuring the description of the various embodiments of the present technology.

Many of the details, dimensions, angles and other features shown in the figures are merely illustrative of particular embodiments. Accordingly, other embodiments can include other details, dimensions, angles and features without departing from the spirit or scope of the present invention. Various embodiments can also include structures other than those shown in the Figures and are expressly not limited to the structures shown in the figures. Moreover, the various elements and features shown in the figures may not be drawn to scale. In the figures, identical reference numbers identify identical or at least generally similar elements.

As used herein, the term "substantially" refers to the complete or nearly complete extent or degree of an action, characteristic, property, state, structure, item, or result. For example, an object that is "substantially" uniform in height to another object would mean that the objects are either completely or nearly completely uniform in height. The exact allowable degree of deviation from absolute completeness may in some cases depend on the specific context, however, generally speaking, the nearness of completion will be so as to have the same overall result as if absolute and total completion were obtained.

As used herein, the term "about" is used to provide flexibility to a numerical range endpoint by providing that a given value may be "above" or "below" the value. For example, the given value modified by about may be, for example, by ±5%, ±10%, ±15%, ±20%.

Wherever used throughout the disclosure and claims, the term "generally" has the meaning of "approximately" or "closely" or "within the vicinity or range of". The term "generally" as used herein is not intended as a vague or imprecise expansion on the term it is selected to modify, but rather as a clarification and potential stop gap directed at those who wish to otherwise practice the appended claims, but seek to avoid them by insignificant, or immaterial or small variations. All such insignificant, or immaterial or small variations should be covered as part of the appended claims by use of the term "generally".

As used herein, the term "building integrated photovoltaic system" or "BIPV" generally refers to photovoltaic systems integrated with building materials to form at least a portion of a building envelope. For example, the BIPV system can form the roof or roofing membrane of a building. The BIPV systems described herein can be retrofitted, can be a part of a new construction roof, or a combination of both. Such building integrated photovoltaic structures can be alternatively referred to as building integrable photovoltaic ("BIP") or building applied photovoltaics ("BAPV"). Components of a BIPV system used, in part, as the actual building envelope (e.g., roofing membrane), can provide a watertight or substantially watertight seal for the roof surface. Alternatively, BIPV systems may merely look like they are part of the roof even through there are other roofing materials making up the building envelope installed below such BIPV systems.

For the sake of distinguishing between structural elements of the present BIPV system, as used herein, the terms "photovoltaic module", "PV module", and "solar cell" refer to the structures of the system with solar energy collecting elements, while the term "PV tile" refers to such solar collecting elements as mounted, adhered to, or located within a structural roof tile. Accordingly, as use herein, a "roof tile" refers to a structural element of a roof, which may or may not have PV elements attached thereto, depending on the context of the description.

As used herein, the terms "up-roof" and "down-roof" are used to provide orientation, direction, position, or a reference point relative to or in context of a roof or roofing surface upon which the systems described herein are installed on and/or form a portion of. Up-roof generally refers to an orientation that is relatively closer to the roof ridge while down-roof refers to an orientation that is relatively closer to the roof eave.

As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", "top", "bottom", "lateral", "left", "right" and the like, may be used herein for ease of description to describe one element or feature's relationship to another element(s) or feature(s) as shown in the figures, and typically are in reference to an orientation of the roof tile and mounting system when mounted on a roof surface for operation. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below, depending on the context of its use. The device may be otherwise oriented (rotated 90 degrees or at other orientations) and the spatially relative descriptors used herein are interpreted accordingly.

Although the terms "first", "second", etc. may be used herein to describe various elements, components, regions, layers and/or sections, it should be understood that they should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

As used herein, the terms "and/or" and "at least one of" include any and all combinations of one or more of the associated listed items.

Generally, PV modules are made with crystalline-based solar cells, which can be either or both of monocrystalline cells or polycrystalline (multi-crystalline) cells. The laminate or wafer forming the solar energy-collecting surface of such PV modules can be mechanically coupled, adhered, or bonded to structurally supporting tiles. In some embodiments, PV modules can include layers of amorphous silicon or thin-film variations of solar energy-collecting laminates, or thin-film solar materials directly applied as continuous sheets. Generally, PV tiles as considered herein, which can include PV modules, solar cells and laminates, have individual structures that can be used in combination to form larger solar arrays and/or building structures, as set forth below. Alternatively, thin-film PV modules, such as cadmium telluride, copper-indium-gallium-diselenide ("CIGS"), or amorphous thin-film silicon may be used. In still further embodiments, cells based on perovskite or other as of yet non-commercialized materials may be used. The particular type of cell technology used for any given installation can be selected both for solar energy collecting functionality and for aesthetic qualities, as related to the present disclosure.

For any given solar panel installation on the roof of a residential, commercial, or industrial building, there is a balance obtained between the power generation of the solar panel array, the visual appearance and aesthetic of the solar panel array, and the structural requirements for mounting or constructing the solar panel array. For BIPV installations as considered herein, the materials for forming the roof and the PV elements for collecting solar radiation are combined into a single unit, where the aesthetic of the solar panel array can be optimized while still maintaining a desired level of power collection and generation. However, not every surface, slope, or region of a roof may be amenable to, or need to be used for, solar energy generation. Thus, BIPV systems can also include "dummy" or "mimic" roof tiles or simply "roof tiles" that can include patterning or silicon elements that appear similar to the PV roof tiles, but do not collect solar radiation and are not electrically interconnected to each other or other PV system components.

PV elements that are distributed over all roof surfaces can have a visual uniformity that is neat, generally continuous, and elegant. Adjusting the density of PV element on a roof surface changes both the appearance of the overall roof and the energy production of the solar array on the roof, typically measured in kilowatts (kW) or kilowatt-hours (kWh). Accordingly, the density of PV elements can be adjusted to achieve a desired kilowatt-hour production goal while maintaining an even distribution of the PV elements with a consistent visual aesthetic. In some aspects, PV elements can be distributed on the surface of a roof in a randomized, semi-randomized, or non-regular pattern to achieve the aesthetically pleasing neat, generally continuous, and elegant appearance.

While such BIPV system provide the considerable benefits of solar along with improved aesthetics, installation of such systems can be cumbersome and time-consuming as compared to installation of a conventional systems since PV tiles are typically smaller than conventional PV modules and each PV tile must typically be electrically connected within the overall PV system, potentially increasing the number of electrical interconnections by as much as an order of magnitude. In addition, such systems can be difficult to service should one or more PV tiles need replacement since any electrical connections can be hard to access. The mounting systems described herein overcome these challenges, allowing for improved ease of installation, versatility in accommodating different types of PV tiles and roof configurations, and further allow for easy removal of individual PV tiles for service or replacement.

Tile Roof Building Integrated Photovoltaic Array

As discussed herein, solar cells that are integrated as part of roof tiles can be connected together and laid down so as to define the main surface of a roof, and in particular, a tile roof. By integrating solar cells into individual roof PV tiles, or clusters of PV roof tiles carry solar cells so that the PV is part of the roof, advantages can be obtained in comparison to more traditional "on-roof" arrays that are elevated above the surface of a roof. For example, roof surfaces formed of PV roof tiles are directly built onto the framing structure of a roof can be lighter than on-roof installations, at least because the built-in BIPV solar array does not require a second structure above an existing roof. Further, a roof that is being replaced in a re-roofing installation can replace older or traditional roof tiles or with PV tiles, which can be more efficient in reducing the amount of materials needed for a re-roofing installation. Also, various electrical connections, junction boxes, and wiring can be generally housed underneath PV tiles of BIPV assemblies, protecting such components from precipitation, wind, and excess heat, and further hiding such components from an observer so as to make the overall BIPV system visually attractive or uniform.

BIPV solar arrays generally aspire to provide for an advantage over traditional on-roof PV systems by having a less drastic topological difference, thereby reducing visually noticeable differences in height on regions of the roof. Embodiments of the present disclosure provide for a BIPV system with solar cells contained within individual roofing tiles and electrically connected by tile connectors movable within a batten bracket, the tile connectors having releasable mechanical and electrical coupling features that allow individual PV tiles or sets of PV tiles to be readily connected within the BIPV system and removed for replacement or service.

One advantage of the present system is that the process of installing the PV roof tiles and making the necessary electrical connections between PV roof tiles is simpler than installing an entire tile or shingle roof and then installing solar over it. To further simplify making electrical connections during installation, the mounting systems described herein can utilize a tile connector that both electrically and mechanically couples the PV roof tile to the roof. This can be accomplished by use of tile connectors having electrical coupling and mechanical coupling features. A BIPV tile roof as considered herein is mounted in generally the same manner as a standard tile roof, for example: securing and sealing underlayment or other sheathing to frame elements of the roof, adding battens as needed to portions of the roof frame, installing tiles to form the main surface of the roof, working around obstacles (e.g., chimneys, skylights, vents, etc.) as needed, and installing ridge and edge tiles in combination with flashing or other trim structures of the roof. In the present system, the roof tiles must have a structural integrity capable of accommodating and supporting PV elements on the tiles, in terms of weight, heat generated, ability to connect electronics, and retaining strength to serve as a portion of a roof surface. The tiles used can be of standard sizes as known in the industry. Further, tiles used for systems considered herein can have a wide range of colors to match or blend with PV elements.

In one aspect, mounting systems in accordance with some embodiments utilize a batten bracket that mounts on a laterally extending wood or metal batten on the roof substrate and multiple tile connectors that interface with the batten bracket and mechanically and electrically couple the PV tiles to the bracket. In some embodiments, the tile connectors are configured such that the mechanical connector portion is separate from the electrical connector portion. Such a configuration is advantageous as the electrical connector can be isolated from the stresses and strains associated with the mechanical connection. In addition, the mechanical connection can be configured to provide some degree of movement, while the electrical connection remains substantially secure. In some embodiments, the connectors built into the PV roof tiles are configured to slide within a channel of the batten bracket, which allows for ease in positioning PV roof tiles.

While such tiles could be installed on any planar roof surface, it is appreciated that it might not be desirable to install such tiles on every planar surface of a given roof. For example, on a given building, the South face of a roof may receive the most incident solar energy, while the North face of the roof of the building may not receive sufficient sunlight to justify the additional cost of PV roof tiles (relative to non-PV roof tiles). To optimize the use of PV elements, solar tiles in accordance with those described herein can be installed on a generally South facing roof, while roof tiles that are similar in appearance but lack integrated solar cells can be installed on the North facing roof to create a consistent design aesthetic. Thus, both the South and North sides of roof surface appear the same and overall costs of materials can be reduced. Likewise, for some roof surfaces, regions of roof surface may be occluded from consistent incident sunlight (e.g. due to shade from a tree), and accordingly, an occluded portion of roof surface can be covered with mimic tiles, in order to avoid wasted costs associated with installing PV tiles in the occluded portion of roof surface that will not generate power.

Various details of the PV tiles described above can be further understood by referring to the example PV tiles in the following figure descriptions.

FIG. 1 shows an exemplary BIPV system 100 installed as part of a roof surface. BIPV system 100 is composed of individual PV roof tiles 10 laid in horizontal rows or courses extending laterally (i.e., left to right) along the length of the roof surface. Batten bracket 30 extends along the top of each course of PV tiles and mechanically couples with a top portion of each PV tile 10 with a tile connector (not shown) slidably disposed within batten bracket 30. Bracket 30 also acts a support for the bottom edge of the next course of tiles, which will overlap and cover the bracket. Vertically adjacent courses of PV tiles 10 are offset from each other by about half the width of each PV roof tile 10, such that seams or breaks between two vertically adjacent rows do not form a single seam or break along the full slope of roof surface. PV roof tiles 10 can be installed on the major planar faces of the roof as well as minor planar faces, such as a gable. While such PV roof tiles allow solar cells to be installed on an increased surface area of the roof as compared to conventional approaches, there are typically some areas where PV roof tiles can't be installed, such as at the ridge, the hips and the valleys of a roof. In these areas, system 100 may incorporate use of "dummy" tiles or basic roof tiles that resemble and ideally match PV tiles in appearance, to create a more uniform consistent look to the roof. These non-PV areas can also be utilized for other purposes such as to cover electrical components of the PV power generation system or to cover a power harness or return cables extending from each string of PV tiles 10.

Figure 2:
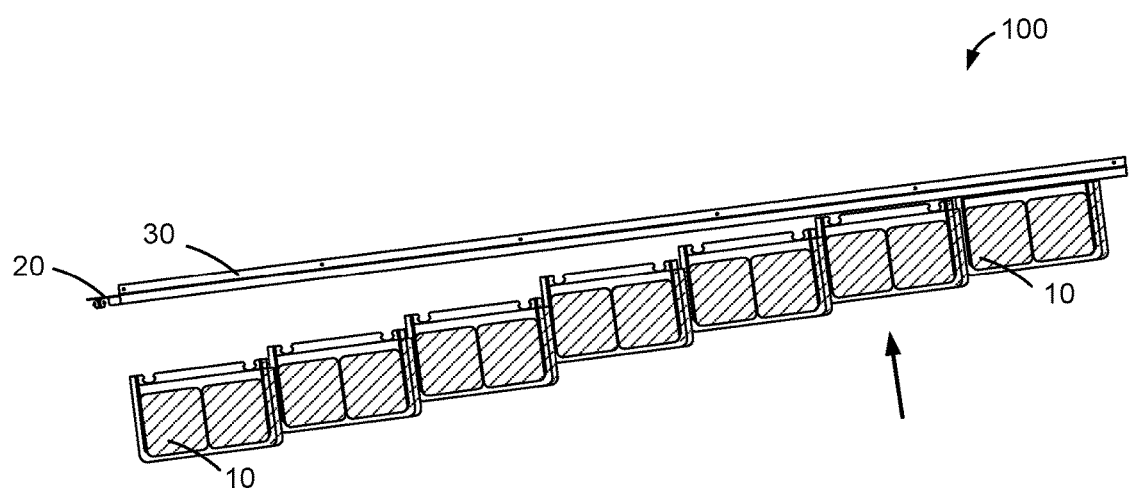
FIG. 2 shows assembly of a course of PV roof tiles with a mounting system according to some embodiments.

FIG. 2 shows a course of PV tiles 10 being assembled during installation. After a suitable underlayment has been applied to the roof deck, installation begins by securing batten bracket 30 to a wood or metal batten extending laterally along the roof surface, typically by driving of mechanical fasteners, such as screws or bolts, through a series of holes in batten bracket 30 into the batten. If not already present in batten bracket 30, multiple tile connectors 20 are then inserted into a channel of batten bracket 30 from one or both ends and slid to a desired position along batten bracket 30 for coupling with respective PV tiles 10 (see FIGS. 6-9 for additional detail in regard to slidable interfacing of tile connectors 20 within batten bracket 30).

Each PV tile 10 is then pressed along an up-roof direction (see arrow) and slid into one or more tile connectors 20. In this embodiment, each tile connector 20 includes a snap-fit type coupling such that an installer hears an audible sound, such as a click, that indicates when each PV tile 10 is mechanically coupled to a respective tile connector 20. Each subsequent PV tile 10 along the course is then overlapped with the previously installed PV tile 10 and slid upwards and clicked into respective tile connectors 20. In this embodiment, each PV tile 10 includes a pair of mechanical coupling features on either side such that each PV tile 10 is slid into a pair of coupling features of two spaced apart tile connectors 20. Since tile connectors 20 are separately slidable, this configuration allows the same tile connectors 20 to accommodate PV tiles of differing dimensions. Also, because connectors 20 merely connect the positive output of one tile to the negative output of the adjacent tile, there is no separate wire constituting the string other than at the end of a row, or at the home run point (i.e., after the last PV roof tile has been connected in series).

Figure 3:
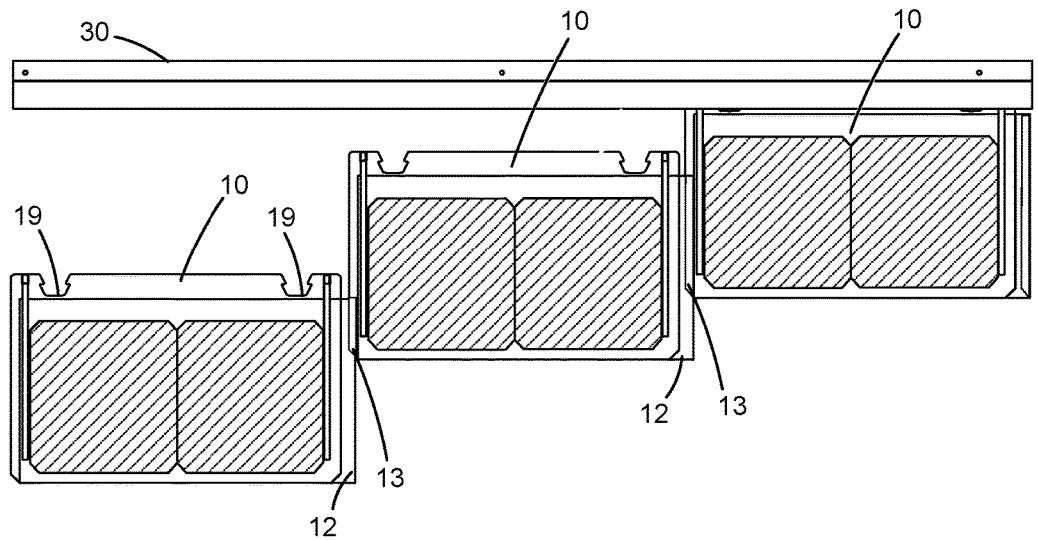
FIG. 3 shows a detail view of assembly of a course of PV roof tiles with a BIPV mounting system according to some embodiments.

FIG. 3 shows a detail view of consecutively mounted PV tiles 10 being slid into tile connectors (not visible) within batten bracket 30. As can be seen, each PV tile 10 includes mechanical coupling features 19 disposed along a top portion thereof, which are snap-fit into tile connectors disposed within a channel of batten bracket 30. Each PV tile 10 also includes a lapping region along opposing lateral edges (e.g. left and right sides) that overlap with corresponding lapping regions on adjacent PV tiles 10 so as to form a substantially water tight seal. In this embodiment, the right side of each PV tile 10 includes an underlapping portion 12 and the left side of each PV tile 10 includes an overlapping portion 13. These features allows the PV tiles 10 to more effectively function as a building-integrated roof surface, that is without requiring a finished tiled or shingled roof surface be installed beneath the mounted PV tile system. As shown in FIG. 3, the corresponding lapping regions 12, 13 are interfaced while each PV tile 10 is slid into the tile connectors within batten bracket 30. It should be appreciated by those of ordinary skill in the art that although the PV roof tiles 10 shown throughout the figures have only a pair of solar cells 16, that PV roof tiles 10 may consist of two, three or even more PV tiles clustered together into a single module containing 4, 6 or N solar cells, where N is an integer greater than 6. In such a case, the module itself may only have two connector portions 19, one at each end to provide electrical and mechanical connection to batten bracket 30. Such modifications are within the spirit and scope of the invention.

Figure 4:
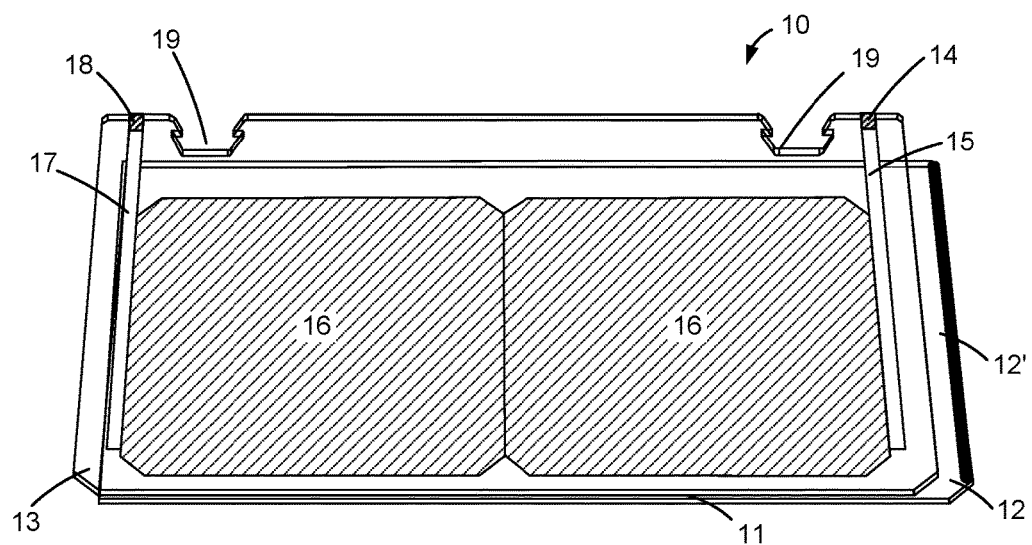
FIG. 4 shows a detail view of a PV roof tile configured for installation with a BIPV mounting system according to some embodiments.

As shown in FIG. 4, PV roof tile 10 is defined in a substantially rectangular shape so as to resemble a conventional shingle or roof tile. It is appreciated that such tiles can be formed in various other shapes including, but not limited to: square, club, step, bullnose, fishtail, arrow, curved, or irregular shapes, and may consist of more than one tile section and more than two solar cells 16. Generally, roof tiles considered for use herein are flat tiles for forming roofing structures, but in other embodiments roof tiles can include, but are not limited to: curved tiles, barrel tiles, s-shaped tiles, Spanish tiles, tiles shaped for the edges of a roof, or tiles shaped to interlock with adjacent tiles, or any shape desired. Such PV tiles 10 are typically defined within a rigid or semi-rigid substrate 11 having one or more solar cells 16. Substrate 11 can be formed of glass or layers of glass overlaying one or more solar cells 16 and/or one or more backing layers, or solar cells 16 can be encased within a laminar substrate material. In some embodiments, PV tiles 10 are formed to have a size and weight similar to roof shingles.

Each solar cell 16 can include PV laminate, which in conventional silicon-based cells, consists of a silicon sandwich of p-doped and n-doped silicon layers, a top glass sheet protecting the laminate, and a back sheet that can include a plurality of layers—and rigid metal frame, supporting PV laminate. Although shown as a unitary structure, such a laminate may include a plurality of individual solar cells that are wired together to form a single unit under a top glass sheet of PV roof tile 10.

Each PV roof tile 10 can include a lapping region on opposing lateral edges to facilitate overlapping of adjacent PV roof tiles 10, as described above so that water is shed down the roof. As shown in FIG. 4, PV roof tile 10 includes an underlap region 12 along a right lateral edge and an overlap region 13 along a left lateral edge and a sealing member 12', such as a silicone bead, is disposed along the underlap portion 12 to further waterproof adjacent overlapping PV roof tiles 10 within the course. It is appreciated that various different types of sealing member could be used, and that one or more sealing member could be provided on one or surfaces of the interfacing lapping regions.

PV roof tile 10 can further include electrical contact portions defined as positive contact 14 and negative contact 18 along a top edge portion of PV tile 10. Positive and negative contacts 14, 18 are electrically coupled to solar cells 16 via positive lead 15 and negative lead 17, respectively. Typically, positive and negative leads 15, 17 are also encapsulated within laminated substrate 11 so as to protect the respective leads from exposure to moisture. In this embodiment, contacts 14, 18 are merely exposed portions of positive and negative leads 15, 17 that extend outside of the substrate to facilitate electrical connection with tile connectors 20. It is appreciated that contacts 14, 17 could be configured according to various other configurations; for example, each contact could be included within a connector (e.g. receptacle or plug) according to various connector types or standards.

PV roof tile 10 further includes mechanical coupling features 19 along the top portion thereof that are separate from electrical contacts 14, 18 so that any stresses or strains at the mechanical coupling features do not compromise the electrical connection. Typically, the mechanical coupling features are disposed adjacent the electrical contacts to help maintain a secure electrical coupling between the contacts and corresponding electronic connectors of tile connectors 20. As shown in FIG. 4, mechanical coupling features 19 can be defined as shaped cutouts that are cut into the top edge of the laminated substrate 11 near the right and left sides of PV tile 10. In this embodiment, the cutouts are shaped so as to receive a corresponding connector of tile connector 20 and locking of the mechanical connector when received therein. This aspect can be further understood by referring to FIGS. 5-7. While this embodiment details a certain shape of cut out, it is appreciated that this concepts can apply to various other shapes as well, or may include various other types of mechanical coupling features as would be known to one of skill in the art.

Figure 5:
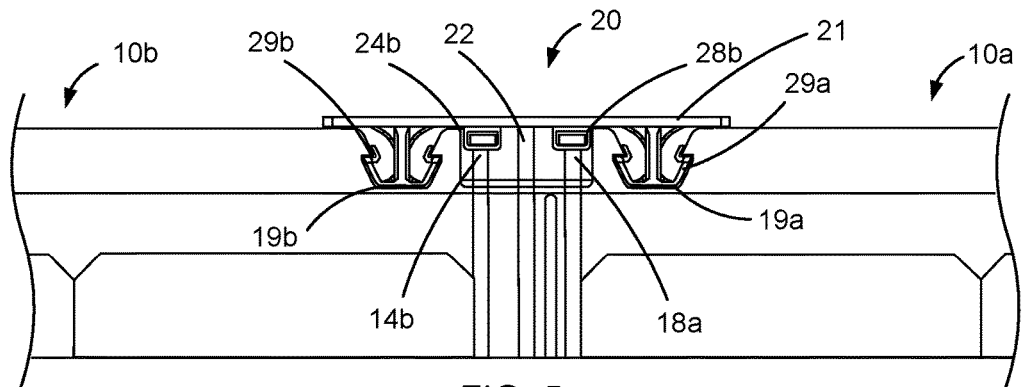
FIG. 5 shows a detail view of adjacent PV roof tiles installed within a BIPV mounting system according to some embodiments.

FIG. 5 shows a detailed view of tile connector 20 both mechanically and electrically coupled with adjacent PV roof tiles 10 within a course. Batten bracket 30 has been omitted for improved visibility of the locked mechanical coupling mechanism. As shown, tile connector 20 includes a pair of mechanical coupling features 29a, 29b between which is disposed an electrical connector portion 22 for interconnecting respective positive and negative leads of respective adjacent PV roof tiles. Mechanical coupling features 29a, 29b are arranged to couple with corresponding coupling features 19a, 19b in adjacent first and second PV roof tiles 10a, 10b. As shown, coupling feature 29a of tile connector 20 mechanically couples with a left side mechanical coupling cut out feature 19a of PV roof tile 10a, while the other mechanical coupling feature 29b of tile connector 20 mechanically couples with right side coupling feature cut out 19b of PV roof tile 10b. Mechanical coupling features 29a, 29b are spaced apart such that when coupled with PV roof tiles 10a, 10b the lapped regions of PV roof tiles 10a, 10b overlap within the course. Such a configuration ensures that PV roof tiles 10 are properly mounted within the structure and maintained as weatherproof roof surface. Between the mechanical coupling features 19a, 19b is electrical connector portion 22, which is defined as a housing with a down-roof facing opening and internal electrical contacts 24, 28 configured for electrically coupling a negative contact 18a of first PV roof tile 10a to positive contact 14b of second PV roof tile 10b adjacent the first PV roof tile 10a within the course. A sealant member, such as a bead of flexible or elastomeric material, may surround electrical contacts 24, 28 so as to seal the electrical connections from water. Housing 22 can be configured to fittingly receive the electrical contact portion of PV roof tile 10, for example using a friction fit or deflectable components that close or clamp the sides of housing 22 onto the electrical contact portion of PV roof tile 10. Such a configuration allows adjacent PV roof tiles 10a,10b to be electrically connected in series without requiring a separate wire bussing between them, while mechanical coupling features 19a, 19B maintain the positions of adjacent PV roof tiles 10a, 10b within the course.

Figure 6:
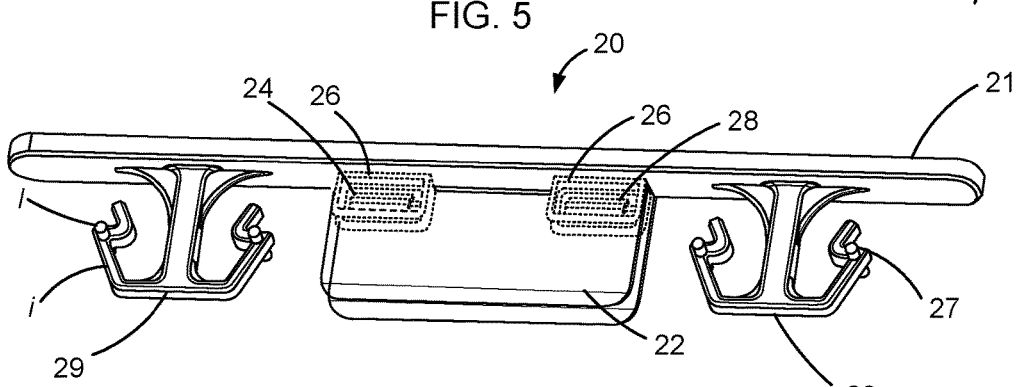
FIG. 6 shows a tile connector of a BIPV mounting system according to some embodiments.

As shown in FIG. 6, tile connector 20 includes top piece 21 from which extends a pair of mechanical coupling features 19a, 19b and electrical connector portion 22. Connector portion 22 is disposed between the pair of mechanical coupling features. Top piece 21 is dimensioned and shaped so as to slide in channel 32 of batten bracket 30. Each mechanical connector 29 is defined by an inverted T-shaped member having a pair of inwardly deflectable spring arms. The spring arms include an angled, inwardly tapered insertion portion (i) to facilitate inward deflection upon insertion of mechanical connector 29 within the corresponding shaped cut-out feature 19 in PV roof tile 10 and locking portion (l) that include a locking surface extending transverse, typically perpendicular to the axis of insertion, that engages a similarly directed surface of the cut-out feature to constrain or lock the retention arms within the shaped notch feature of PV roof tile 10. Mechanical coupling features 29 can further include removal feature 27 to facilitate dis-engagement of corresponding mechanical coupling features by use of removal tool 40 to allow removal of PV roof tile 10 from batten bracket 30. Removal feature can be defined as a post that extends perpendicular from the plane along which mechanical coupling feature extends and typically disposed along or near locking portion (l).

Figure 7:
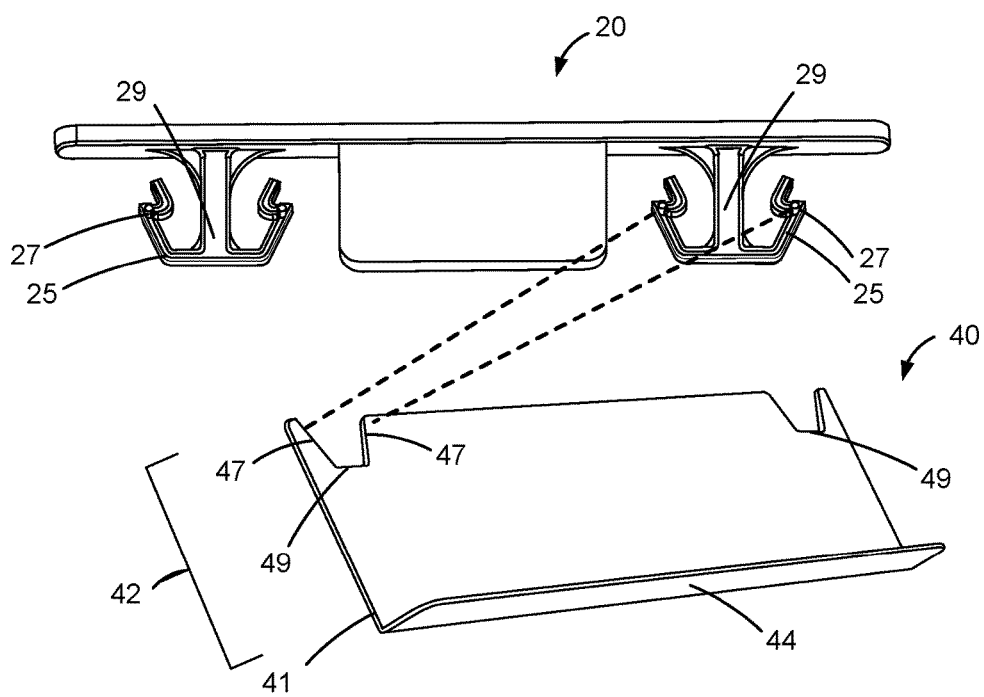
FIG. 7 shows a tile connector of a BIPV mounting system and an associated removal tool according to some embodiments.

As shown in FIG. 7, removal tool 40 may be formed from a rigid substrate 41, such as sheet metal, and include removal notches 49 configured to engage the removal feature posts 27 described above. Each removal notch includes inwardly angled surfaces 47 dimensioned to engage removal feature posts 27 of mechanical coupling feature 29 so that, when removal tool 40 is pressed in an up-roof direction against tile connector 20, engagement of inwardly angled surfaces 47 against posts 27 deflect the pair of retention arms inward thereby dis-engaging the locking surfaces of locking portion (l) to allow the PV roof tile 10 to be withdrawn. In this embodiment, removal posts 27 extend perpendicularly from mechanical coupling features 29 in each direction such that tile connectors 20 can be used with either side facing upward. In this embodiment, removal tool 40 includes a distally extending planar portion 42 and a proximal bent-up handle portion 44. Planar portion 42 is dimensioned to be thin enough to be slid under an overlying course of PV roof tiles 10 to facilitate disengagement of an underlying PV roof tile 10 by engagement of removal notches 47 with removal posts 27 of underlying PV roof tile 10. Bent-up handle portion 44 allows the user to manually position and press removal tool 40 upwards to disengage corresponding mechanical coupling features 29 of a respective PV roof tile 10 for removal.

In this embodiment, removal notches 49 of removal tool 40 are spaced apart by a width corresponding to a distance between coupling features of a single PV roof tile 10 or set of PV roof tiles 10. This configuration allows removal tool 40 to concurrently remove two mechanical coupling features 29 from two tile connectors 20 supporting a single PV roof tile 10. It is appreciated that such a removal tool could be dimensioned or configured in various other ways as desired, for example, a single removal notch could be included for dis-engagement of a single mechanical coupling feature or three or more notches could be included for concurrent dis-engagement of multiple coupling features to allow removal of two or more PV tiles 10.

Figure 8:
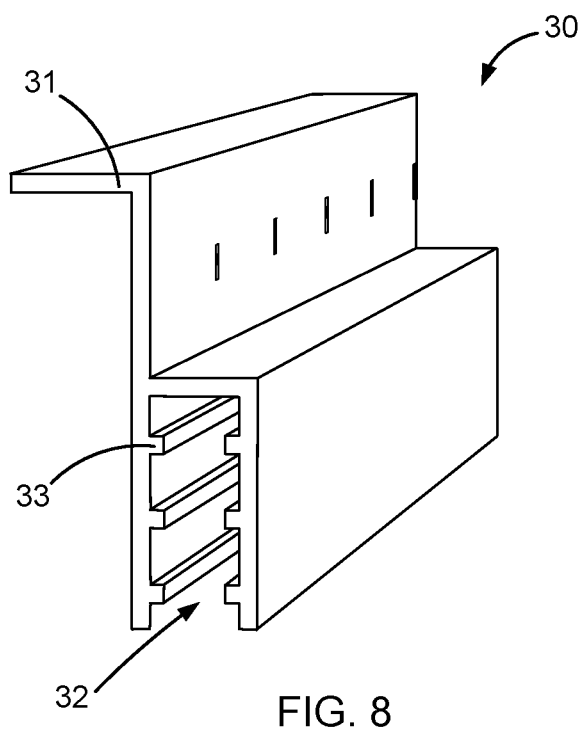
FIG. 8 shows a batten bracket for use with a BIPV mounting system according to some embodiments.
Figure 9:
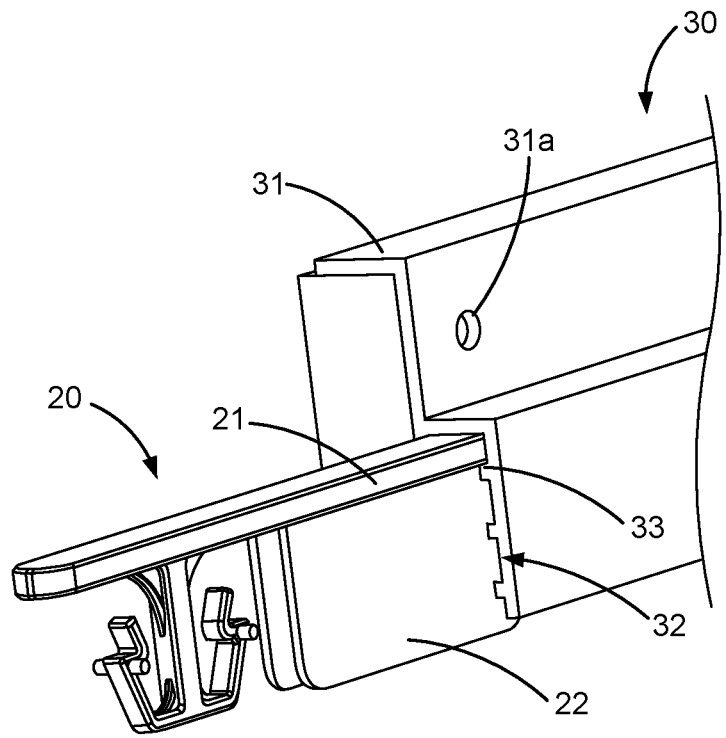
FIG. 9 shows a tile connector within a batten bracket of a BIPV mounting system according to some embodiments.
Figure 10:
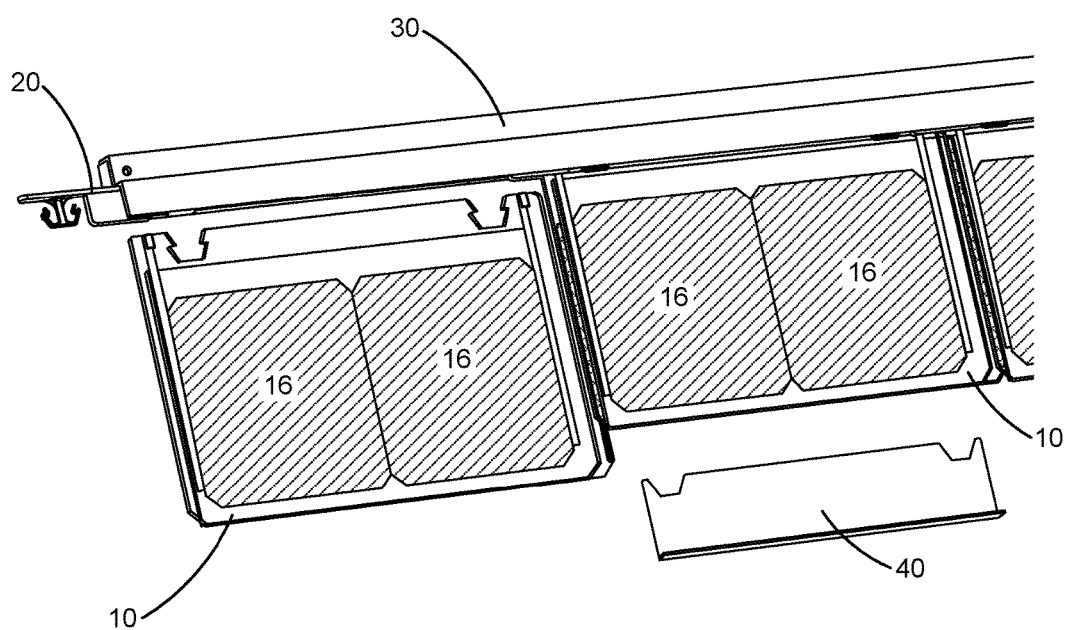
FIG. 10 shows removal of a PV roof tile from a BIPV mounting system with a removal tool according to some embodiments.

FIGS. 8 and 9 show an exemplary batten bracket 30 suitable for use with tile connectors 20 within BIPV system 100. In this embodiment, batten bracket 30 includes upper leg 31 dimensioned to engage a wood or metal batten extending laterally along the roof substrate. Batten bracket 30 can be of fairly simple construction with a constant cross-section such that batten bracket 30 can be formed by extrusion, for example an extruded aluminum alloy, and cut to any desired length. Typically, upper leg 31 includes a series of holes 31a along its length to allow mechanical attachment of batten bracket 30 to the batten by use of mechanical fasteners, such as lag bolts or screws. In some embodiments, batten bracket 30 can include a lower foot (not shown) that extends a distance down roof and is mechanically fastened to the roof substrate to resist upward twisting movement of batten bracket 30 and prevent uplift of a course of PV roof tiles in strong winds. Batten bracket 30 further includes internal channel 32 dimensioned to slidably receive tile connectors 20 from one or both ends of batten bracket 30. Channel 32 opens in a down-roof direction to facilitate insertion of a PV tile from below. Such a configuration allows tile connectors 20 to be maintained substantially within or entirely within the channel so that the mechanical coupling features and electrical coupling portions are protected from exposure to weather. Channel 32 can include one or more internal ribs 33 configured to constrain a top sliding portion 21 of tile connectors 20 positioned within the channel, for example within an uppermost portion of the channel, as shown in FIG. 9. Additional ribs to constrain the top sliding portion 21 of connectors 20 can be used to adjust the tile reveal by some increment. Additional rows of spaced apart ribs can be used to engage and stabilize the housing of the electrical connector portion, as can be seen in FIG. 9. An overview showing tile connector 20 interfaced within channel 32 of batten bracket 30 with PV tile 10 having been removed from the course of PV tiles 10 with removal tool 40 is shown in FIG. 10.

FIGS. 11A-11C and 12 show BIPV tile systems 100 and associated wiring configurations, in which PV tiles 10 of each course are electrically connected in series. A string of PV roof tiles can be electrically connected together as a subset circuit of roof surface to have a specific or desired number of solar cells as part of the subset. Such subset circuits can have a specific number of solar cells to build to a desired voltage or kilowatt production. For example, a subset circuit of electrically connected PV tiles can have four (4) solar cells, six (6) solar cells 16, eight (8) solar cells 16, ten (10) solar cells 16, twelve (12) solar cells 16, or any number of solar cells within or around that numerical range. By extension, subset circuits can alternatively have more solar cells 16 to build to higher voltage and kilowatt levels, for example having 20-cell, 24-cell, 30-cell, 36-cell, 40-cell, 42-cell, 48-cell, 54-cell, 56-cell, 60-cell, 70-cell, 80-cell, or 92-cell embodiments. Further embodiments can have PV tiles with other number-of-solar-cell embodiments above, below, or within the above-considered increments. The various embodiments of strings with different numbers of solar cells allows for flexibility in selecting solar panels appropriate for any given system installation.

Figure 11A:
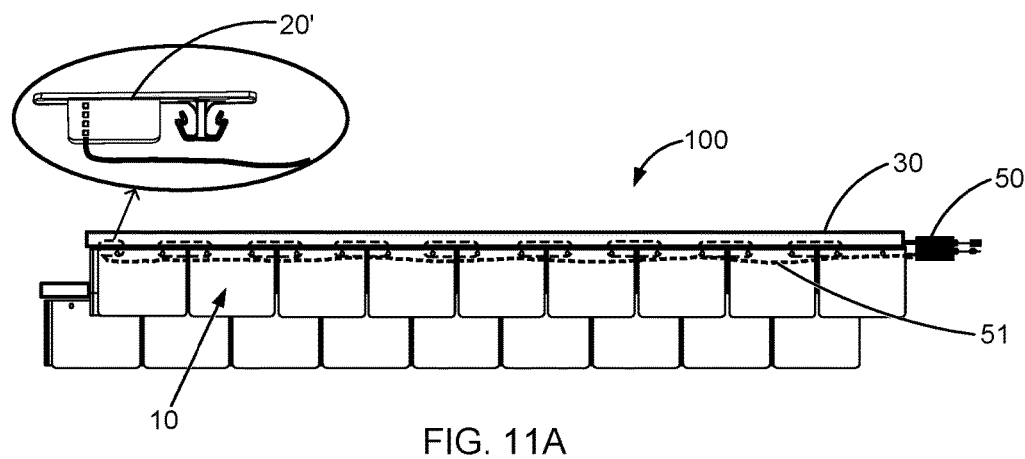
FIGS. 11A-11C show wiring configurations of various BIPV mounting systems for solar roof tiles according to some embodiments.

As shown in FIG. 11A, the course of PV roof tiles 10 is electrically coupled in series through tile connectors 20 to power optimizer 50, which is directly coupled to the first electrical contact of the first PV tile 10 of the course. It is appreciated that such a power optimizer is not required and the courses could be connected to each other to form a conventional PV string that is then connected to the inverter. In this embodiment, the wire bussing of the system includes return cable 51 extending from the last PV tile 10 of the course to power optimizer 50. In some embodiments, power optimizer 50 is used for each course of PV tiles 10, whereas in other embodiments, one power optimizer can be used for multiple courses interconnected as a single string. In some embodiments, return cable 51 can be attached in a harness and suspended just below batten bracket 30 in a cavity between the course of PV roof tiles 10 and the roof substrate. In some embodiments, the course of PV roof tiles 10 can include single end tile connectors 20' that include a single mechanical coupling feature 29 and an electrical connector portion to facilitate mechanical coupling of the last tile of the course and electrical coupling with return cable 51. It is appreciated that return cable 51 could be connected to tile connector 21' in the same manner as an adjacent PV roof tile 10 or tile connector 21' could include a specialized connector for connection with return cable 51. In some embodiments, an end cap or ridge cap can be applied along the ends of each course or across multiple courses to constrain any tile connectors within the batten bracket and further secure the courses of PV roof tiles 10 within the respective batten brackets 30.

Figure 11B:
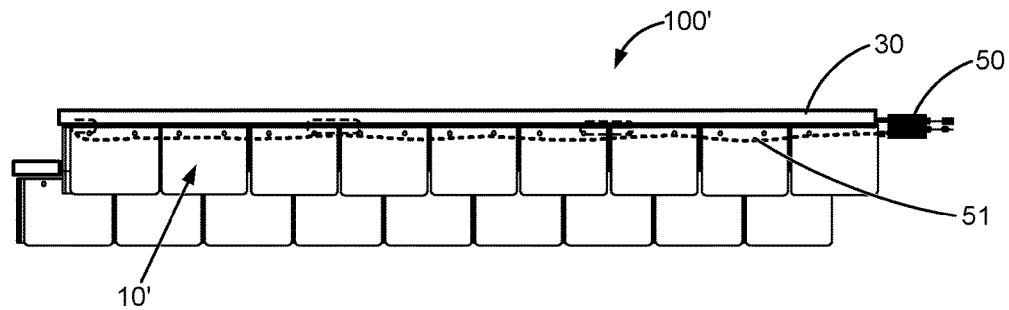

FIG. 11B shows another PV tile system 100' with a similar electrical wire bussing and tile connector configuration as in FIG. 11A, however, the courses are composed of sets of interconnected PV roof tiles 10. Each set includes three standard size PV roof tiles 10, which can be permanently coupled together or bonded, or integrally formed. Such a configuration is useful as it allows for quicker installation of the system and requires about one-third the number of tile connectors 20. Depending on the length and dimension of the sets, tile connectors may extend further so as to mechanically couple with the set of PV tiles 10 at more evenly distributed locations to more uniformly support the set of PV tiles 10 or intermediate tile connectors having only mechanical coupling features could be used. It is appreciated that sets of PV roof tiles 10 can be defined to include various numbers of PV tiles 10 including sets that vary in number of PV tiles 10 as desired for a particular roof configuration.

Figure 11C:
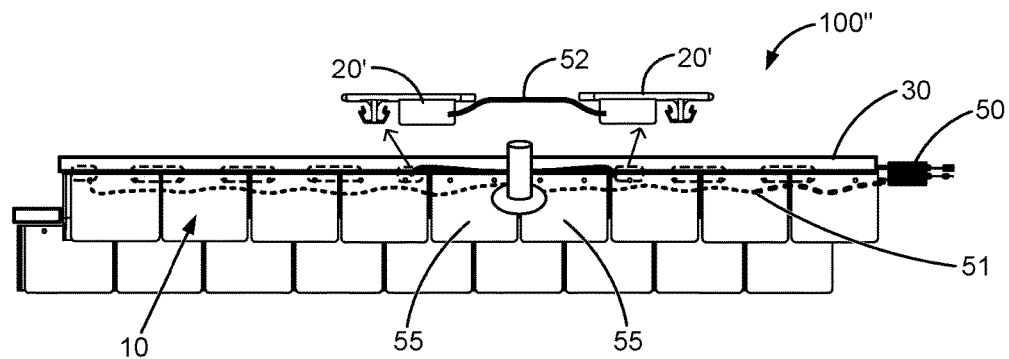

FIG. 11C shows yet another PV tile system 100" that utilizes non-PV ("dummy") roof tiles 55 in locations that may not be suitable for PV roof tiles; for example, locations where partial tiles or modified tiles are needed, such as where a vent pipe protrudes through the roof substrate. In various embodiments, non-PV roof tiles 55 are constructed to appear substantially similar or identical to the PV roof tiles but can be cut or modified since there is no PV structure embedded within the laminate stack. Use of such tiles allows the PV system 100" to be building-integrated, while providing a seamless appearance between PV roof tiles 10 and non-PV roof tiles 55. Since the course of tiles are connected series, when non-PV tiles 55 are utilized in an intermediate portion of a course of tiles, the electrical connection must account for the gap or separation between PV tiles 10 along the course. In some embodiments, the non-PV tiles 55 can include embedded leads that extend along an upper portion that is not modified or cut so that electrical connectivity in series can be maintained through use of the same tile connectors 20 described above or by use of modified connectors or other such means. In some embodiments, end tile connectors 21 could be used on the PV roof tiles 10 on each side of the gap in which dummy non-PV tiles 55 are used and a bridging cable 52 can be used to electrically connect the respective PV roof tiles 10 across the gap. Depending on the length of the gap, bridging cable 52 could merely be placed underneath the dummy non-PV tiles 55 or could be secured by a harness, similar to that described for the return cable 51.

Figure 12:
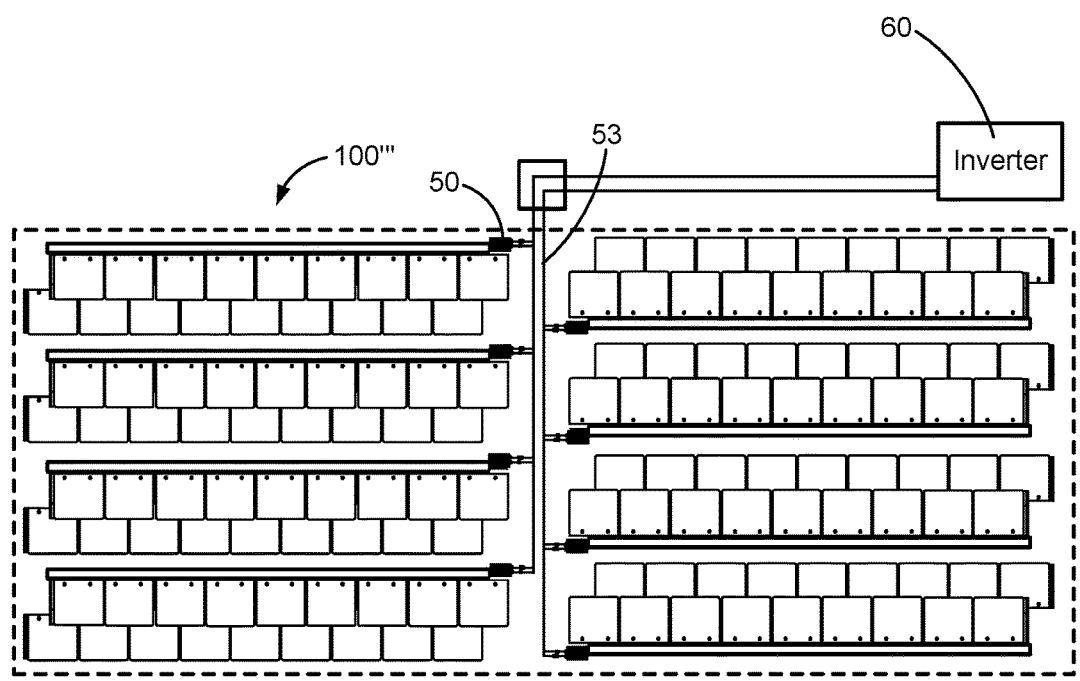
FIG. 12 shows a BIPV mounting system and associated wiring configuration for solar roof tiles according to some embodiments.

FIG. 12 shows BIPV System 100''' having multiple low voltage PV roof tile courses, each course or set of courses being electrically connected through power optimizer 50 and connected to a central trunk 53, which in turn is electrically coupled to central or string inverter 60. One challenge associated with such systems is that optimizer input circuits must be rated the same voltage as the output circuits (i.e. full string voltage). One manner in which this can be dealt with is to use plastic casings and remove any grounded surfaces within the low voltage circuit area (indicated in dashed lines). Any transition or combiner box, wireways, or various other components outside the dashed border can have grounded metal parts. Thus, the inverter or any components carrying higher voltages can be located outside the low voltage PV tile area, such as on the ground or inside the building on which the PV system is installed. This avoids a high voltage rating for the PV tile area, thereby avoiding undue overregulation during installation.

In any of the embodiments described herein, both PV roof tiles 10 and non-PV roof tiles 55, can be mounted as part of roof surface with other structural components to form the envelope of a building. PV roof tiles supporting or embedded with one or more solar cells can be specifically configured to accommodate electrical junction boxes, diodes or micro-inverters on each individual PV tile, located on the bottom surface (underside) of relevant roof tiles. Wiring, cables, and/or power buses to electrically connect PV tiles, and by extension solar cells on PV tiles, can string together a plurality of PV tiles. To avoid physical conflicts with underlying studs, rafters, joints, battens, buttresses, or other infrastructure of a roof, such electrical components can be attached to the underside of PV tiles in locations to avoid physical conflicts.

Other aspects of the roof surface can interface with the BIPV systems described herein to provide further improvements in performance and aesthetics. For example, ridge flashing can include a ridge cap at the top of the resultant BIPV array that is used for venting, heat dissipation, wire management, and to generally conceal and protect wires (e.g., conduits or cables) or other equipment (e.g., fans, vents, connectors, inverters, jumpers, home-run connections). Waterproofing components, such as liners or trim, can be set underneath or between PV tiles such that roof surface properly functions as a roof to prevent water from entering the structure of the building. Such BIPV systems can also include other roofing components (e.g., flashings, gutters, vents, caps, covers, trims), for example, at eave flashing, hips, valleys, or sides of the roof.

Figure 13:
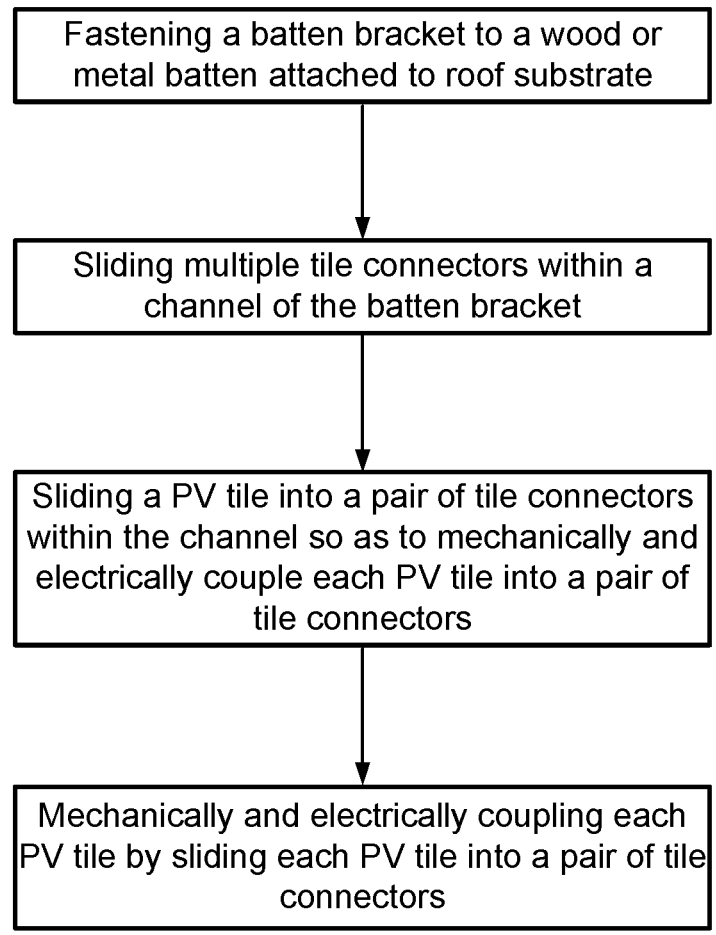
FIGS. 13-14 illustrate methods of installing PV roof tiles with a BIPV mounting system according to some embodiments.
Figure 14:
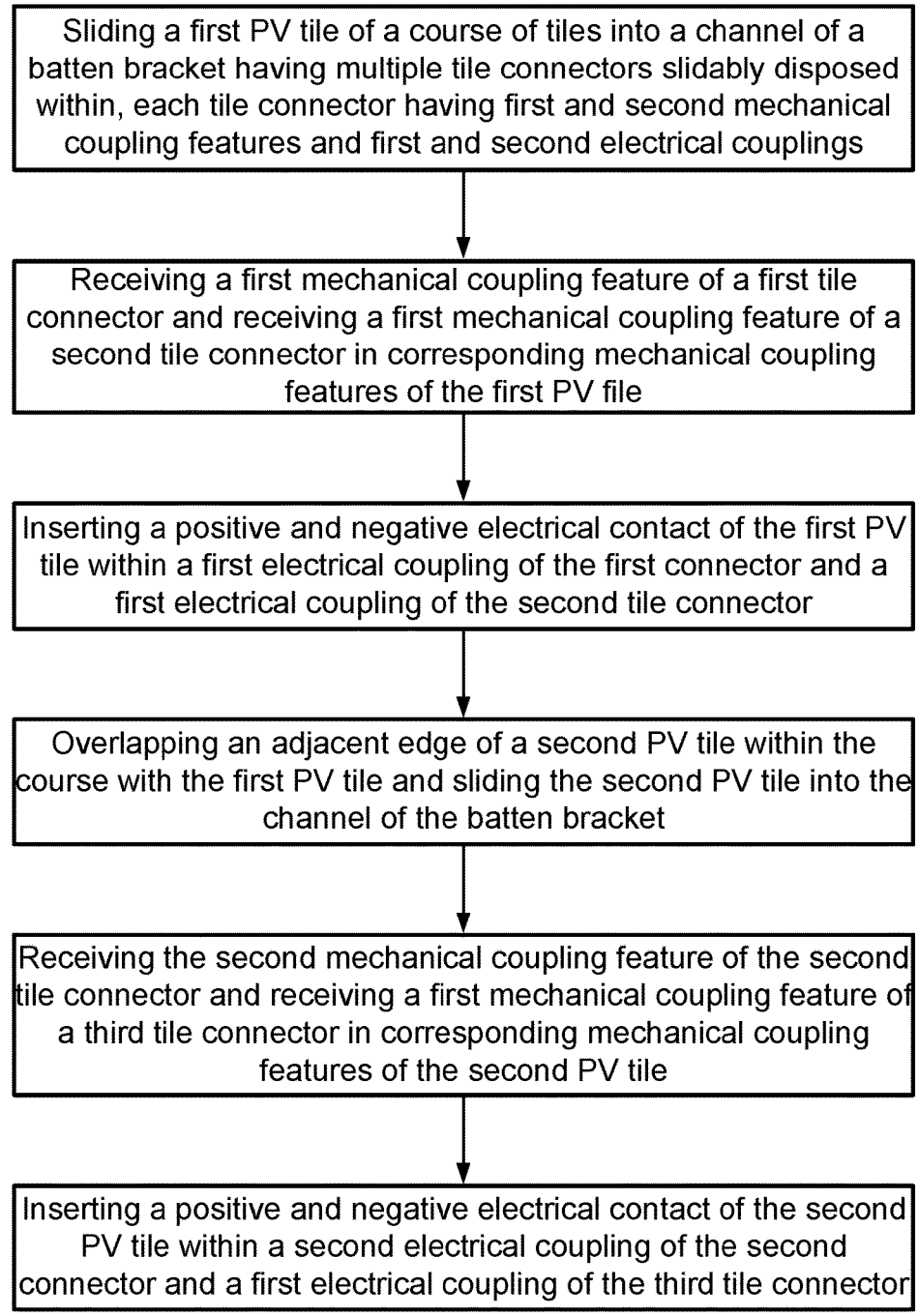

FIGS. 13-14 depict methods of installation of BIPV system according to one or more of the various concepts described herein. It is appreciated that the methods described herein could use any of the mechanical and electrical coupling features described herein, or could include various other mechanical or electrical coupling features as would be known to one of skill in the art.

FIG. 13 is a block diagram detailing steps of a method of installing a PV system that includes steps of: fastening a batten bracket to a wood or metal batten attached to roof substrate; sliding multiple tile connectors within a channel of the batten bracket; inserting a PV roof tile into a pair of tile connectors within the channel so as to mechanically and electrically couple each PV tile into a pair of tile connectors; and mechanically and electrically coupling each PV tile by sliding each PV tile into one or more tile connectors. Typically, a single PV roof tile is supported by a pair of the slidable tile connectors since each connector spans the gap between two adjacent tiles. This also allows the tile connectors to be slid to any desired position within bracket 30 to support a tile. This allows the mounting system to accommodate PV roof tiles 10 of different lengths or a PV system combining tiles of varying lengths.

FIG. 14 is a block diagram detailing steps of a method of installing a PV system that includes steps of: sliding a first PV roof tile of a course of tiles into a channel of a batten bracket having multiple tile connectors slidably disposed within, each tile connector having first and second mechanical coupling features and first and second electrical couplings; receiving a first mechanical coupling feature of a first tile connector and receiving a first mechanical coupling feature of a second tile connector in corresponding mechanical coupling features of the first PV roof tile; and inserting a positive and negative electrical contact of the first PV roof tile within a first electrical coupling of the first connector and a first electrical coupling of the second tile connector. The method can further include steps of: overlapping an adjacent edge of a second PV roof tile within the course with the first PV roof tile; sliding the second PV roof tile into the channel of the batten bracket; receiving the second mechanical coupling feature of the second tile connector and receiving a first mechanical coupling feature of a third tile connector in corresponding mechanical coupling features of the second PV roof tile; and inserting a positive and negative electrical contact of the second PV roof tile within a second electrical coupling of the second connector and a first electrical coupling of the third tile connector. Typically, the mechanical coupling feature is received and the electrical contact is inserted into the electrical coupling of the tile connectors concurrently upon sliding of a respective PV roof tile into the first and second tile connectors within the channel, for example by use of the tile connectors described herein.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples; alternative implementations may employ differing values or ranges, and can accommodate various increments and gradients of values within and at the boundaries of such ranges.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

The invention claimed is:

1. A building-integrated photovoltaic system comprising:
a plurality of roof tiles, each roof tile being formed of a laminate structure with at least one photovoltaic cell encapsulated therein, a positive and negative electrical lead of the at least one photovoltaic cell disposed within the substantially planar laminate structure and extending to respective positive and negative electrical contacts disposed along an exterior top portion of the respective roof tile when mounted to the roof within a course; and
a plurality of tile connectors, each being slidable within a laterally extending channel of a batten bracket and each being configured for mechanically coupling directly adjacent roof tiles of the plurality within the course along the top portions thereof and electrically coupling a negative electrical contact of a respective roof tile of the plurality with a positive electrical contact of an adjacent roof tile of the plurality within the course,
wherein each tile connector of the plurality of tile connectors comprises three protruding portions that protrude in a down-roof direction when slidably disposed within the channel of the batten bracket,
wherein the three protruding portions comprise:
a first protruding portion comprising a mechanical connector that directly mechanically couples to a top portion of a first roof tile of adjacent roof tiles within the course;
a second protruding portion that includes an electrical connector that directly electrically connects the adjacent roof tiles; and
a third protruding portion comprising a mechanical connector that directly mechanically couples with a top portion of a second roof tile of the adjacent roof tiles within the course.

2. The system of claim 1 wherein the electrical connector is configured for electrically coupling with respective positive and negative electrical contacts of the two adjacent roof tiles.

3. The system of claim 2 wherein the first, second, and third protruding portions are separate portions and are laterally offset.

4. The system of claim 3 wherein the mechanical coupling features of the first and third protruding portions are configured to releasably couple with a corresponding pair of mechanical coupling features along the top edge of two adjacent roof tiles when mounted in the course.

5. The system of claim 4 wherein each mechanical coupling feature is configured to snap-in within a correspondingly shaped notch within the top portion of the respective roof tiles.

6. The system of claim 5 wherein each of the mechanical coupling features includes a pair of resiliently deflectable spring arms configured to deflect inwardly when inserted along an insertion axis when into the corresponding notch and resiliently return to a laterally extended position when mated within the corresponding notch so as to constrain movement of the roof tile along the insertion axis.

7. The system of claim 6 wherein each of the resilient spring arms includes a post protruding away from the roof surface when the roof tiles of the plurality are mounted such that concurrent engagement of the posts of the resiliently deflectable spring arms inwardly deflects the spring arms toward the insertion axis to facilitate release of the mechanical coupling feature from the corresponding notches of adjacent roof tiles.

8. The system of claim 7 further comprising:
a removal tool comprising a planar member having a pair of notches along a top edge thereof, each notch having a pair of angled surfaces dimensioned to concurrently engage respective posts of the pair of resilient spring arms of a respective mechanical coupling feature to facilitate release of the mechanical coupling features from the respective notch.

9. The system of claim 4 wherein the second protruding portion having the electrical connector is disposed between the first and third protruding portions having the mechanical connectors.

10. The system of claim 9 wherein the electrical connector comprises a connector housing configured to receive a pair of electrical connector portions of adjacent roof tiles within the course.

11. The system of claim 10 wherein the electrical connector portions of adjacent roof tiles comprise a negative contact of the first roof tile of adjacent roof tiles and a positive contact of the second roof tile of adjacent roof tiles such that the first and second roof tiles are connected in series.

12. The system of claim 1 wherein each of the plurality of roof tiles comprises lapping regions extending along opposing lateral sides when mounted within the course such that a respective tile of the plurality overlaps an adjacent roof tile of the plurality within the course.

13. The system of claim 12 wherein the opposing lateral sides comprise a left side and a right side relative the top portion, the lapping region along the right side comprises an underlap region and the lapping region along the left side comprises an overlap region wherein the overlap region overlaps the underlap region in adjacent roof tiles in the course.

14. The system of claim 12 wherein one or both of the lapping regions of each roof tile comprises a sealant bead to facilitate sealing when interfaced with the lapping region of an adjacent roof tile within the course.

15. The system of claim 1 wherein the batten bracket is configured to be mounted on a laterally extending batten mounted on a roof substrate, and the channel is dimensioned such that the plurality of tile connectors are slidably disposed therein.

16. The system of claim 15 wherein the channel of the batten bracket includes one or more internal ridges to maintain an orientation of the plurality of tile connectors when slid within the channel.

17. A building-integrated photovoltaic roof tile system comprising:
a plurality of photovoltaic roof tiles;
a pair of tile connectors, each tile connector having three protruding portions that include:
a first protruding portion including a mechanical connector for directly mechanically coupling with a first photovoltaic roof tile of the plurality of photovoltaic roof tiles,
a second protruding portion including an electrical connector directly electrically coupling directly adjacent photovoltaic roof tiles, and
a third protruding portion including a mechanical connector for directly mechanically coupling with a second photovoltaic roof tile of the plurality of photovoltaic roof tiles; and
each tile including:
a substantially planar laminate structure of a substantially rectangular shape and having at least one photovoltaic cell encapsulated therein;
respective positive and a negative electrical leads connected to opposing ends of the at least one photovoltaic cell;
a first and a second cut out along a top portion of the roof tile when mounted within a laterally extending course, wherein the first and second cut out are each shaped to receive a corresponding mechanical connector of one of the pair of tile connectors therein so as to releasably couple with the pair of tile connectors; and
a positive electrical contact electrically coupled with the positive lead and a negative electrical contact electrically coupled with the negative lead, wherein the positive and negative electrical contacts are projected out of the planar laminate structure and are disposed on the top portion of the roof tile with the positive electrical contact adjacent the first cut out and the negative electrical contact adjacent the second cut out to facilitate electrical coupling with corresponding electrical connectors portion of the pair of tile connectors.

18. The system of claim 17 wherein each roof tile further comprises an overlap portion along one lateral side and an underlap portion along an opposite lateral side so as to facilitate overlap with adjacent tiles when installed within the course.

19. The system of claim 18 wherein the roof tile further comprises one or more sealant beads along an interfacing surface of one or both of the overlap portion and the underlap portion.

20. A building-integrated photovoltaic roof tile system comprising:
a plurality of photovoltaic roof tiles;
a pair of tile connectors, each tile connector having three protruding portions that include:
a first protruding portion including a mechanical connector for directly mechanically coupling with a first photovoltaic roof tile of the plurality of photovoltaic roof tiles,
a second protruding portion including an electrical connector for directly electrically coupling directly adjacent photovoltaic roof tiles, and
a third protruding portion including a mechanical connector for directly mechanically coupling with a second photovoltaic roof tile of the plurality of photovoltaic roof tiles; and
each tile including:
a laminate structure with at least one photovoltaic cell encased therein, wherein the roof tile has a left and a right edge relative to a top portion thereof when mounted within a laterally extending course of tiles,
wherein the roof tile includes a first mechanical coupling feature along the top portion near the left edge of the tile and a second mechanical coupling feature along the top portion near the right edge of the tile each first and second mechanical coupling feature configured for directly mechanically coupling with the mechanical connectors of the pair of tile connectors, and
wherein each roof tile includes a positive electrode contact disposed exterior to and along the top portion between the left edge of the tile and adjacent first mechanical coupling feature and a negative electrode contact disposed exterior to and along the top portion between the right edge and adjacent second mechanical coupling feature, the positive and negative electrode contacts configured such that the positive and negative electrode contacts of directly adjacent roof tiles directly electrically connect with the electrical connector of one of the pair of tile connectors.

* * * * *